United States Patent [19]

Kempthorne

[11] 3,722,397

[45] Mar. 27, 1973

[54] HOPPER DUST HOOD

[76] Inventor: Richard L. Kempthorne, 5701 Bayview Dr., Ft. Lauderdale, Fla. 33308

[22] Filed: Apr. 19, 1971

[21] Appl. No.: 136,277

[52] U.S. Cl. ..................98/115 R, 55/385, 222/193, 222/195, 239/142
[51] Int. Cl. ..............................................B65g 3/18
[58] Field of Search .........55/430, 431, 385; 239/142; 222/193, 195; 98/115; 56/34.5

[56] References Cited

UNITED STATES PATENTS

| | | | |
|---|---|---|---|
| 1,310,815 | 7/1919 | Weaver | 239/654 |
| 1,785,944 | 12/1930 | Ezdorf et al. | 222/193 |
| 2,105,589 | 1/1938 | Eades | 141/93 |
| 3,121,593 | 2/1964 | McIlvaine | 222/195 |

FOREIGN PATENTS OR APPLICATIONS 847,612   7/1970   Canada..................................98/115

*Primary Examiner*—Bernard Nozick
*Attorney*—Eugene F. Malin

[57] ABSTRACT

A dust removal hood for a portable hopper that receives fibers to be agitated, and fed in a generally uniform mixture through the conduit to a spray nozzle. The dust removal hood collects and transfers the rising fiber dust from the hood area to the spray nozzle. The hood includes a trough or conduit along the top of the hood adjacent the hood opening. A conduit is connected between the hood trough and the intake of the hopper blower. The hopper blower transfers the dust through a transfer hose leading from the hopper to the spray nozzle in order to eliminate dust in the atmosphere and to utilize the fiber dust by discharging the fiber dust into the spray nozzle.

3 Claims, 3 Drawing Figures

PATENTED MAR 27 1973 3,722,397

RICHARD LEWIS KEMPTHORNE
INVENTOR.
BY Eugene P. Malin
ATTORNEY

HOPPER DUST HOOD

BACKGROUND OF THE INVENTION

This invention relates to a new and improved dust removal hood, and, more particularly to a dust removal hood having a trough connected to the intake side of a hopper blower in order to remove the rising dust in a hopper. Thus eliminating the cloud of dust that normally rises from the hopper and pollutes the ambient air.

BRIEF DESCRIPTION OF THE INVENTION

The present invention relates to a dust removal hood that is removably connected to the top of a fiber hopper that agitates and meters the fibers placed in the hopper. The dust removal hood includes a trough along the top of the hood adjacent the hood opening, a conduit connected between the trough and the intake of the hopper blower. The vaccum created in the trough of the hood removes the dust that rises from the hopper. The rising dust is created when one fills the hopper, by agitating the fibers in the hopper, and by breaking up lumps of fibers in the hopper. The hopper blower is utilized to transfer the collected dust to the spray nozzle in order to prevent dust contamination of air in the hopper area.

It is an object of this invention to provide a dust removal hood for removing all the dust that rises from the hopper.

Another object of this invention is to provide a non-complex hood with a vaccum return in the upper portion of the hood to collect and eliminate the dust rising in the hopper.

A further object of this invention is to provide a non-complex dust removable hood for a fiber agitation hopper.

In accordance with these and other objects which will be apparent hereinafter, the instant invention will now be described with particular reference to the accompanying drawing.

DESCRIPTION OF A PREFERRED EMBODIMENT

Figure 2:
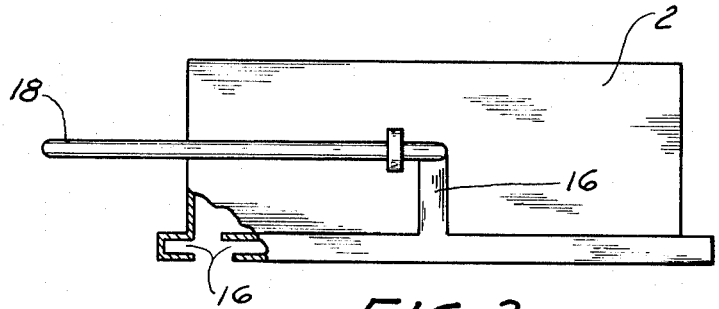
FIG. 2 is a top view partially broken away of the dust removal hood shown in FIG. 1.
Figure 3:
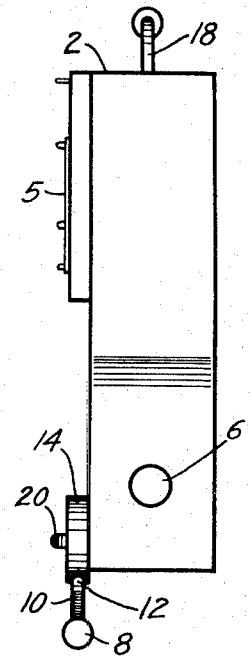
FIG. 3 is a side view of FIG. 1.
Figure 1:
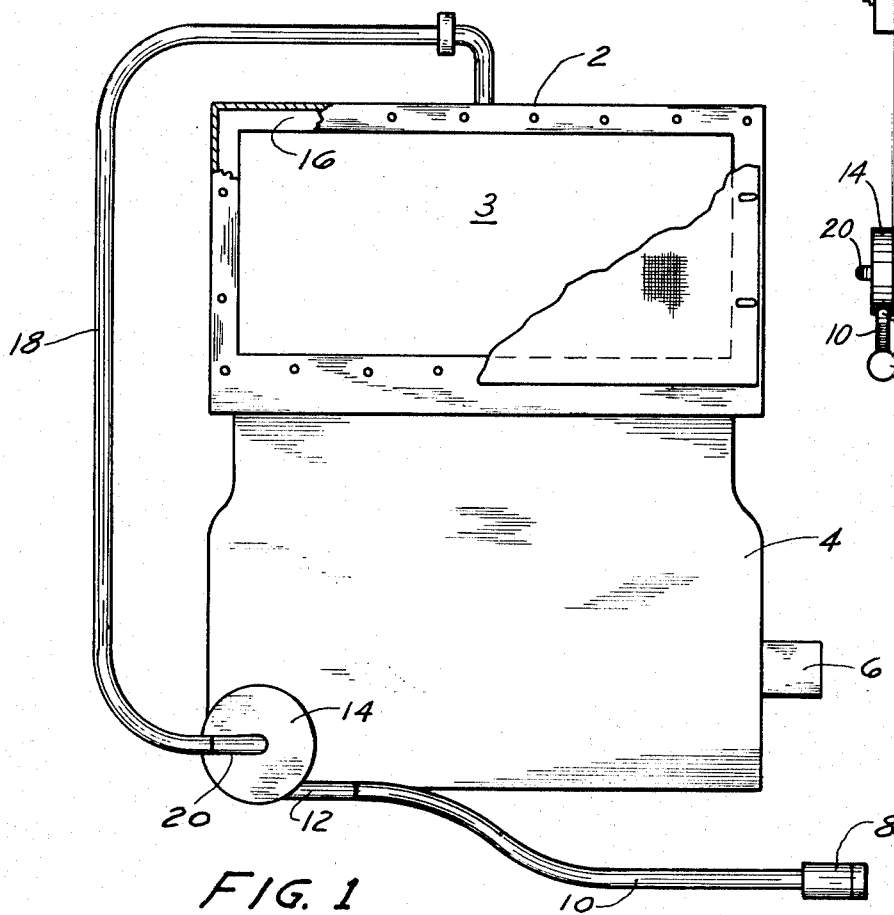
FIG. 1 is a front view partially broken away of the dust removal hood and hopper.

Referring now in detail to the drawing, wherein an embodiment of the invention is shown, and referring to the Figures, the dust removal hood, generally designated as numeral 2 including a fill opening 3 on one side and snap on cover 5, is placed on top of a hopper 4. The fiber hopper 4 agitates and feeds the fibers dumped into the hopper by agitating fingers connected to the motor shaft, not shown, of motor 6. The fiber hopper 4 transfers the fibers placed in the hopper 4 to spray nozzle 8 by means of hose 10 connected to the output pipe 12 of the hopper blower 14.

The dust removal hood 2 includes a trough 16, a conduit 18 connected to the input pipe 20 of hopper blower 14. As the dust rises in the hopper when the hopper is filled with fibers, or when fibers are agitated in the hopper 4, the vaccum in the trough 16 draws the dust into the removal system. The dust is transferred through the trough 16 into the conduit 18 and into the hopper blower 14. The blower utilizes the dust by transferring the dust through the transfer hose 10 leading from the hopper 4 to the spray nozzle 8. The dust is utilized in the product formed by the spray nozzle instead of allowing it to contaminate the ambient air surrounding the hopper.

The hood is removably connected to the hopper so that it may be removed when the hopper is transferred from job site to job site. Also, this invention allows the hopper to be used when it is necessary to provide a generally dust-free atmosphere about the hopper. Such a device not only prevents local pollution, but allows the hopper to be used in confined spaces, such as in ships under construction. A ship may be fireproof without harm to the men applying the coating of fireproof in the hull of a ship. Further, it is absolutely necessary when doing fireproof and insulation work in electrical power stations that the atmosphere be free of dust because dust will cause shorts to occur across high tension leads and bus bars.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A removable hood for a portable fiber hopper that agitates and feeds the fiber and dust to a nozzle comprising:

a portable hopper including a blower for transferring material from said hopper, a hose connected to said blower, and a nozzle at the distal end of said hose for distributing said material, and a hood including an open bottomed hood cover, a fill opening in one side of the hood, a trough along the top of the hood adjacent the fill opening and a conduit connected between the intake of the blower in the hopper and the trough in the hood for removing polluting dust from the hopper to provide unpolluted ambient air surrounding the hopper.

2. A removable hood for a portable fiber hopper that agitates and feeds the fiber and dust to a nozzle as set forth in claim 1 wherein:

said fill opening includes a snap on cover for the closing of the fill opening.

3. A removable hood for a portable fiber hopper that agitates and feeds the fiber and dust to a nozzle as set forth in claim 2 wherein:

the trough includes a generally U-shaped member for removing dust from the hopper atmosphere.

* * * * *